United States Patent
Mokhtari et al.

(10) Patent No.: US 11,221,395 B2
(45) Date of Patent: Jan. 11, 2022

(54) CHIP-BASED TRANSMIT CHANNEL ARCHITECTURE

(71) Applicant: GM Global Technology Operations LLC, Detroit, MI (US)

(72) Inventors: Mehran Mokhtari, Tarzana, CA (US); Ara Kurdoghlian, La Canada, CA (US); Jongchan Kang, Moorpark, CA (US); Daniel Kuzmenko, Roseville, CA (US); Emilio A. Sovero, Thousand Oaks, CA (US); Robert G. Nagele, Thousand Oaks, CA (US); Hasan Sharifi, Agoura Hills, CA (US); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 16/538,498

(22) Filed: Aug. 12, 2019

(65) Prior Publication Data

US 2021/0048508 A1    Feb. 18, 2021

(51) Int. Cl.
| | | |
|---|---|---|
| *G01S 7/03* | (2006.01) | |
| *G01S 13/931* | (2020.01) | |
| *H01P 5/18* | (2006.01) | |
| *H01P 1/202* | (2006.01) | |

(52) U.S. Cl.
CPC .......... *G01S 7/032* (2013.01); *G01S 13/931* (2013.01); *H01P 1/202* (2013.01); *H01P 5/183* (2013.01)

(58) Field of Classification Search
CPC .......... G01S 7/03; G01S 7/032; G01S 13/931
See application file for complete search history.

(56) References Cited

U.S. PATENT DOCUMENTS

| | | | | |
|---|---|---|---|---|
| 5,481,268 A | * | 1/1996 | Higgins ................. | G01S 7/032 342/111 |
| 10,326,420 B1 | * | 6/2019 | Bellaouar ........... | H03F 3/45269 |
| 2006/0132350 A1 | * | 6/2006 | Boltovets ................ | G01S 7/032 342/70 |
| 2007/0285307 A1 | * | 12/2007 | Nishijima ................ | G01S 7/35 342/200 |
| 2008/0080599 A1 | * | 4/2008 | Kang ...................... | G01S 13/34 375/219 |
| 2012/0146845 A1 | * | 6/2012 | Chen .................... | G01S 13/584 342/200 |
| 2012/0235857 A1 | * | 9/2012 | Kim ...................... | G01S 13/345 342/134 |

(Continued)

OTHER PUBLICATIONS

Nashashibi et al. ("Fully Polarimetric FMCW Instrumentation Radar at 228 GHz", 2017 USNC-URSI Radio Science Meeting (Joint with AP-S Symposium), Date of Conference: Jul. 9-14, 2017, Date Added to IEEE Xplore: Oct. 19, 2017. pp. 35-36). (Year: 2017).*

*Primary Examiner* — Peter M Bythrow
(74) *Attorney, Agent, or Firm* — Cantor Colburn LLP

(57) ABSTRACT

A radar system includes a transmit section to emit a transmit signal. A chip-based front-end portion of the transmit section increases a frequency of an input signal to produce an intermediate signal and amplifies signal strength of the intermediate signal to produce the transmit signal. The frequency of the input signal is in a range of 76 gigahertz (GHz) to 80 GHz. The radar system also includes a receive section to receive a reflected signal resulting from reflection of the transmit signal by an object.

20 Claims, 4 Drawing Sheets

(56) References Cited

U.S. PATENT DOCUMENTS

| | | | |
|---|---|---|---|
| 2016/0077196 A1* | 3/2016 | Dehlink | G01R 31/2822 |
| | | | 342/169 |
| 2017/0336503 A1* | 11/2017 | Hammerschmidt | G01S 13/42 |
| 2018/0231651 A1* | 8/2018 | Charvat | G01S 7/282 |
| 2019/0195985 A1* | 6/2019 | Lin | G01S 7/023 |
| 2019/0207640 A1* | 7/2019 | Hsu | H04B 7/2662 |
| 2020/0091617 A1* | 3/2020 | Lee | G01S 13/87 |
| 2020/0191902 A1* | 6/2020 | Herrault | G01S 7/032 |
| 2020/0313288 A1* | 10/2020 | Kona | H01Q 13/10 |
| 2020/0386854 A1* | 12/2020 | Melzer | G01S 13/584 |

* cited by examiner

CHIP-BASED TRANSMIT CHANNEL ARCHITECTURE

INTRODUCTION

The subject disclosure relates to a chip-based transmit channel architecture.

Vehicles (e.g., automobiles, trucks, construction equipment, farm equipment, automated factory equipment) increasingly include sensors to obtain information about the vehicle and its environment. Semi-autonomous or autonomous operation of the vehicle is facilitated by the sensors. Exemplary sensors include radio detection and ranging (radar) systems, light detection and ranging (lidar) systems, and cameras. Generally vehicle radar systems emit radio frequency (RF) signals in the 77 gigahertz (GHz) range, but high-resolution imaging can be achieved by increasing the radar operation frequency (i.e., the frequency of the transmitted signals). At the same time, in a vehicle environment, space considerations necessitate a compact signal-generating portion (i.e., RF front end). Accordingly, it is desirable to provide a chip-based transmit channel architecture.

SUMMARY

In one exemplary embodiment, a radar system includes a transmit section to emit a transmit signal. A chip-based front-end portion of the transmit section increases a frequency of an input signal to produce an intermediate signal and amplifies signal strength of the intermediate signal to produce the transmit signal. The frequency of the input signal is in a range of 76 gigahertz (GHz) to 80 GHz. The radar system also includes a receive section to receive a reflected signal resulting from reflection of the transmit signal by an object.

In addition to one or more of the features described herein, the front-end portion includes a three times multiplier to increase the frequency of the input signal and produce the intermediate signal with a frequency range of 228 GHz to 240 GHz.

In addition to one or more of the features described herein, the intermediate signal is split to provide input to two or more channels, each of the two or more channels includes a power amplifier to amplify a signal strength of the input and provide amplified output, and the amplified output of each of the two or more channels is combined to provide the transmit signal.

In addition to one or more of the features described herein, the front-end portion includes a splitter to split the input signal as input to each of the two or more channels.

In addition to one or more of the features described herein, each of the two or more channels includes a multiplier to increase the frequency of the input to the channel and generate an intermediate signal.

In addition to one or more of the features described herein, each of the two or more channels includes a power amplifier to amplify a signal strength of the intermediate signal of the channel and produce an amplified signal.

In addition to one or more of the features described herein, the front-end portion includes a combiner to combine the amplified signal of each of the two or more channels to provide the transmit signal.

In addition to one or more of the features described herein, the front-end portion includes two or more electrostatic discharge (ESD) devices, each of the two or more ESD devices acts as a bandpass filter for a range of frequencies.

In addition to one or more of the features described herein, at least one of the two or more ESD devices passes a frequency of the input signal, and at least another of the two or more ESD devices passes a frequency of the intermediate signal.

In addition to one or more of the features described herein, the radar system is disposed in a vehicle, and information obtained by processing the reflected signal is used to control an operation of the vehicle.

In another exemplary embodiment, a method of assembling a radar system includes forming a transmit section to emit a transmit signal, and fabricating a chip-based front-end portion of the transmit section to increase a frequency of an input signal to produce an intermediate signal and amplify signal strength of the intermediate signal to produce the transmit signal, the frequency of the input signal being in a range of 76 gigahertz (GHz) to 80 GHz. The method also includes forming a receive section to receive a reflected signal resulting from reflection of the transmit signal by an object.

In addition to one or more of the features described herein, the fabricating the front-end portion includes fabricating a three times multiplier to increase the frequency of the input signal and produce the intermediate signal with a frequency range of 228 GHz to 240 GHz.

In addition to one or more of the features described herein, the fabricating the front-end portion includes arranging a passive splitter to split the intermediate signal and provide input to two or more channels, fabricating a power amplifier in each of the two or more channels to amplify a signal strength of the input and provide amplified output, and arranging a combiner to combine the amplified output of each of the two or more channels to provide the transmit signal.

In addition to one or more of the features described herein, the fabricating the front-end portion includes arranging a splitter to split the input signal as input to each of the two or more channels.

In addition to one or more of the features described herein, the fabricating the front-end portion includes fabricating a multiplier in each of the two or more channels to increase the frequency of the input to the channel and generate an intermediate signal.

In addition to one or more of the features described herein, the fabricating the front-end portion includes fabricating a power amplifier in each of the two or more channels to amplify a signal strength of the intermediate signal of the channel and produce an amplified signal.

In addition to one or more of the features described herein, the fabricating the front-end portion includes arranging a combiner to combine the amplified signal of each of the two or more channels to provide the transmit signal.

In addition to one or more of the features described herein, the fabricating the front-end portion includes forming two or more electrostatic discharge (ESD) devices to act as a bandpass filter for a range of frequencies, and the forming includes sizing each of the two or more ESD devices based on the range of frequencies.

In addition to one or more of the features described herein, the fabricating the front-end portion includes forming and disposing at least one of the two or more ESD devices to pass a frequency of the input signal, and forming and disposing at least another of the two or more ESD devices to pass a frequency of the intermediate signal.

In addition to one or more of the features described herein, the method also includes disposing the radar system in a vehicle and controlling an operation of the vehicle by using information obtained by processing the reflected signal The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
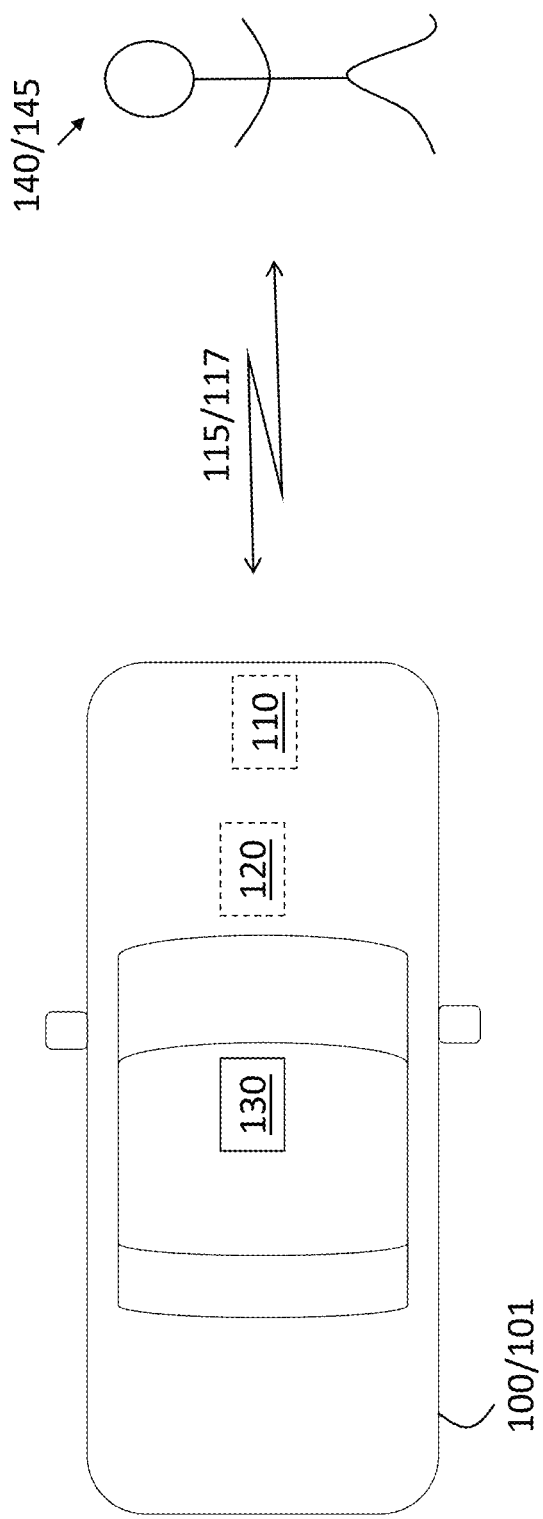
FIG. 1 is a block diagram of a vehicle with a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, in applications such as a vehicle application, component size is a consideration. Thus, aspects of a radar system may be fabricated as integrated circuits (i.e., chips). As also noted, high resolution imaging can be achieved with higher frequency transmit signals in a radar system. However, increasing the operational frequency typically degrades the transmission power. While one approach is to use a larger, higher power transmitter, increased size of a transmitter on silicon (Si) (i.e., on the chip) corresponds with an increased cost. Additionally, electrostatic discharge (ESD) protection is not currently available at very high frequency ranges. Embodiments of the systems and methods detailed herein relate to a chip-based transmit channel architecture that achieves the desired higher frequencies while addressing size and ESD concerns. An up-converter is used to increase the frequency of the transmit signal, and an amplifier is used to achieve practical detection ranges. These components are on the chip. As also described, ESD protection is combined with a matching network.

In accordance with an exemplary embodiment, FIG. 1 is a block diagram of a vehicle 100 with a radar system 110. The exemplary vehicle 100 is an automobile 101. The vehicle 100 may include one or more other sensors 130 (e.g., camera, lidar system) in addition to the radar system 110. The sensor 130 may be used separately or in conjunction with the radar system 110 to detect objects 140 such as the pedestrian 145 shown in FIG. 1. As shown transmit signals 115 are emitted and reflection signals 117 are received by the radar system 100. The reflection signals 117 result when the transmit signals 115 encounter an object 140 and are reflected back. As discussed with reference to FIGS. 2 and 3, the transmitted signals 115 are higher frequency signals than typical automotive radar signals and, thus, facilitate obtaining high-resolution radar images.

The vehicle 100 also includes a controller 120. Processing of data obtained by the radar system 110 may be performed within the radar system 110 or by the controller 120 using processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. A combination of the radar system 110 and controller 120 may be used to process the data. The controller 120 may control operation of the vehicle 100 (e.g., autonomous driving, semi-autonomous driving such as collision avoidance, automatic braking, adaptive cruise control) based on the detection of objects 140. Aspects of the radar system 110 are further detailed with reference to FIG. 2.

Figure 2:
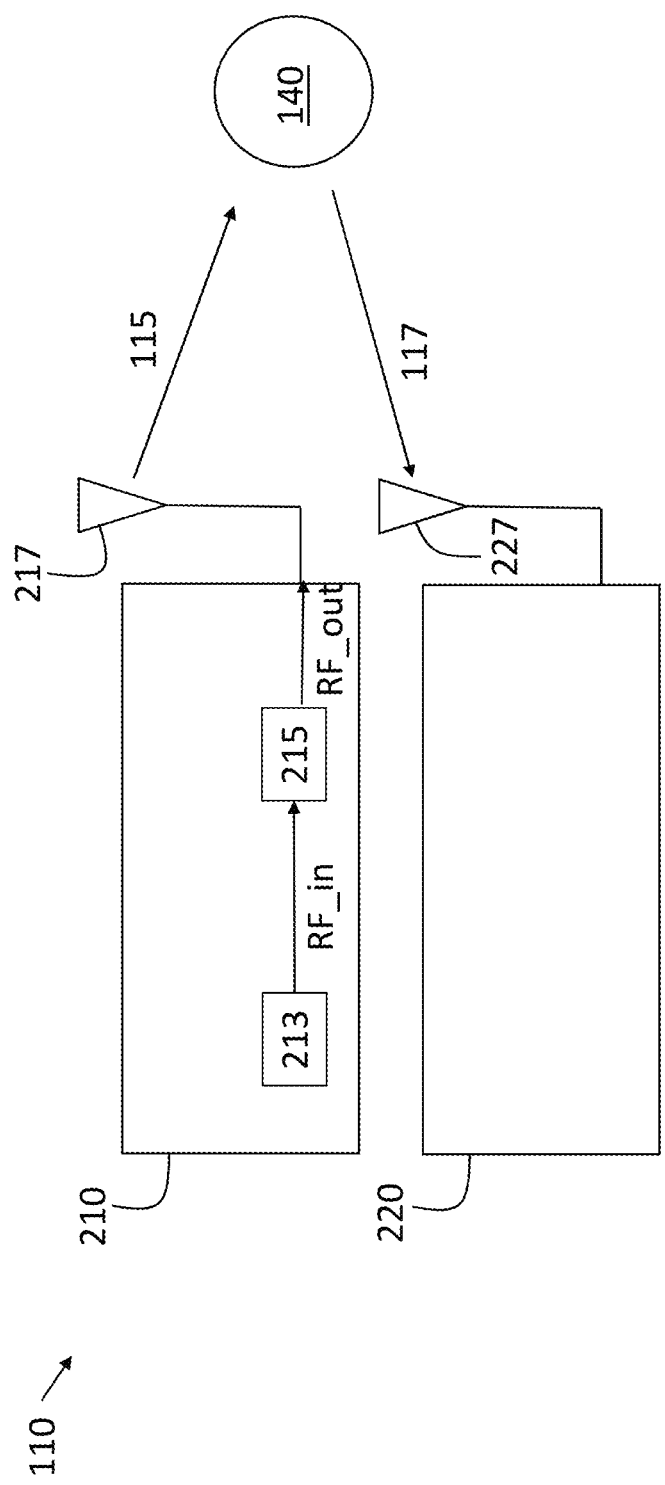
FIG. 2 is a block diagram of aspects of the radar system according to one or more embodiments.

FIG. 2 is a block diagram of aspects of the radar system 110 according to one or more embodiments. As FIG. 2 indicates, the radar system 110 generally includes a transmit section 210 and a receive section 220. The transmit section 210 includes a signal generator 213 that generates a signal as an input signal RF_in to the RF front end 215. The RF front end 215 is further detailed with reference to FIGS. 3 and 4. The output signal RF_out of the RF front end 215 is emitted by a transmit antenna 217 as the transmit signal 115. Although one transmit antenna 217 is shown, the transmit section 210 may include two or more transmit antennas 217 according to additional or alternate embodiments. If the transmit signal 115 encounters an object 140, the resulting reflection signal 117 is received through a receive antenna 227 into the receive section 220. In alternate embodiments, two or more receive antennas 227 may be part of the receive section 220. As previously noted, the reflection signals 117 may be processed by processing circuitry within the radar system 110, by the controller 120, or by a combination of the two.

Figure 3:
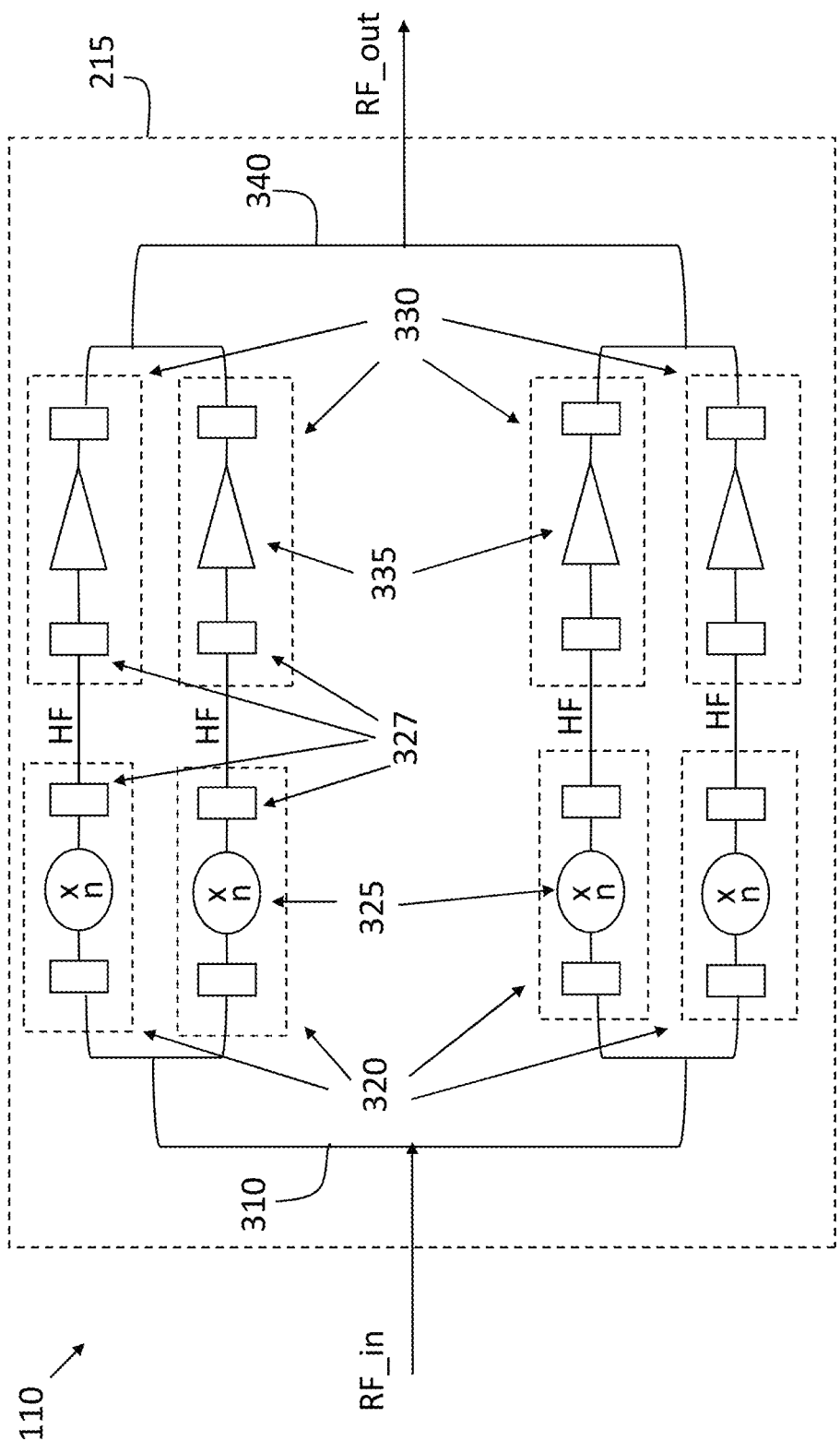
FIG. 3 is a block diagram of a chip-based transmit channel architecture in a radar system according to exemplary one or more embodiments.

FIG. 3 is a block diagram of a chip-based transmit channel architecture in a radar system 110 according to exemplary one or more embodiments. An exemplary embodiment of the RF front end 215, which generates the transmit signal 115, is shown. The components shown include a splitter 310, four up-conversion sections 320, four amplification sections 330, and a combiner 340. These components increase the frequency of an input signal RF_in to produce an output signal RF_out as the transmit signal 115. The input signal RF_in may be on the order of 76 GHz to 80 GHz, the typical transmit frequency for automatic radar applications. According to the embodiment shown in FIG. 3, the signal strength of the input signal RF_in exceeds the power limit of complementary metal-oxide-semiconductor (CMOS) technology, which is on the order of 0 to 2 decibels relative to one milliwatt (dBm). The power limit relates to the breakdown voltage limit of the CMOS chip. The power limit may be derived from the fact that the difference between the input terminal (gate) and output terminal (drain) of a CMOS transistor cannot exceed 1 volt. According to alternate embodiments, other semiconductor technologies that exhibit similar limitations to necessitate using the splitter 310 and combiner 340 may be used.

The signal strength of the input signal RF_in may be 6 dBm, for example. Because the up-conversion sections 320 and the amplification sections 330 are fabricated as one or more CMOS transistors, the input signal RF_in is split to decrease the signal strength provided to each up-conversion section 320, as shown. In the exemplary case shown in FIG. 3, the input signal RF_in is split to four channels using a splitter 310, but based on its signal strength, the input signal RF_in may be split into more or fewer channels. In the exemplary case, the splitter 310 is a four-way micro coax splitter, for example. The splitter 310 does not include any active devices with power limits. In the exemplary case of an input signal RF_in with a signal strength of 6 dBm being split into four channels, each channel receives a fourth of the power or 0 dBm.

Each up-conversion section 320 includes a multiplier 325 and ESD devices 327 at both the input and output of each multiplier 325. The multiplier 325 is not limited to be a particular value. For example, the multiplier 325 may triple the frequency of the input signal RF_in (i.e., n=3) to produce a higher frequency intermediate signal HF. Thus, the exemplary frequency range of 76 GHz to 80 GHz for the input signal RF_in may be up-converted to 228 GHz to 240 GHz for the intermediate signal HF. The ESD devices 327 may not be circuits with diodes and other parts that impose a load and limit frequency performance. Instead, the ESD devices 327 may be implemented as a shorted stub, which is a metal layer with dimensions designed for a specific frequency range such that only signals in that specific frequency range are not shorted to ground.

That is, the ESD devices 327 may act as a band pass filter that passes a specific frequency range. In the exemplary case, the ESD device 327 at the input of each multiplier 355 passes a frequency range that includes 76 GHz to 80 GHz, and the ESD device 327 at the output of each multiplier 355 of each up-conversion section 320 passes a frequency range that includes 228 GHz to 240 GHz. The multiplier 325 results in losses that reduce the signal strength at the output of the up-conversion section 320 in comparison with the signal strength at the input of the up-conversion section 320. The loss may be on the order of 10 dB. In the exemplary case of 0 dBm signal strength at the input of the up-conversion section 320, the signal strength at the output of the up-conversion section 320 is −10 dBm. Thus, an amplification section 230 follows the up-conversion section 320.

Each amplification section 330 includes a power amplifier 335 with ESD devices 327 at the input and output. Unlike the ESD devices 327 at the input and output of the multiplier 325, the ESD devices 327 at the input and output of the power amplifier 335 are tuned for the same frequency range, the range of the intermediate signal HF. While each amplification section 330 is shown with one power amplifier 335, two or even more power amplifiers 335 may be included in a chain in each amplification section 330. The amplification required from each amplification section 330 and, thus, the number of power amplifiers 335 needed may be selected by working backwards from the desired signal strength of the output signal RF_out.

Generally, signal strength on the order of 6 dBm may be desirable for the output signal RF_out which is emitted as the transmit signal 115. This signal strength corresponds with a detection range on the order of 100 meters. Thus, as previously noted, the minimum amplification needed by each amplification section 330 may be determined. This minimum amplification must consider the subsequent combiner 340. Each combiner 340 is a four-way micro coax combiner according to an exemplary embodiment. The exemplary micro coax for the combiner 340 and previously noted splitter 310 may be inverted micro-strop and inverted trapped grounded co-planar waveguides. Such a micro coax desensitizes the interconnects to any unknown fill material due to packaging of the circuit and, thus, maintains signal integrity, especially at the frequencies of operation. The micro coax also eliminates the risk of radiation and outside interference and improves isolation properties between signal lines and devices. This combiner 340 aggregates signal power at the output of each amplification section 330 but can introduce some loss itself. In the exemplary case of four channel being combined by the combiner 340, the signal strength at the output of each amplification section 330 must exceed 0 dBm for the output signal RF_out to have a signal power of at least 6 dBm.

Figure 4:
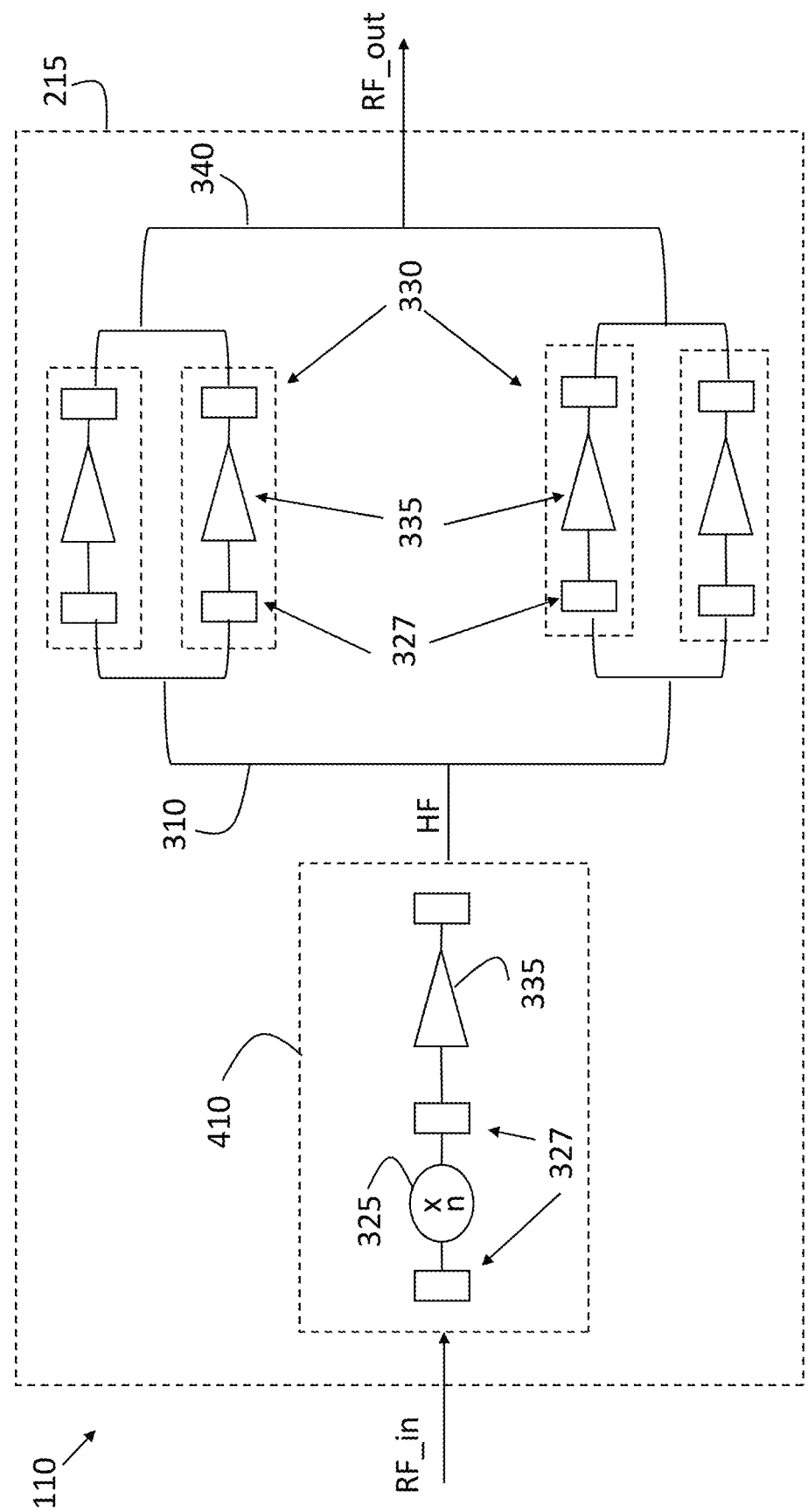
FIG. 4 is a block diagram of a chip-based transmit channel architecture in a radar system according to additional exemplary one or more embodiments.

That is, in order for four times the signal strength (i.e., an addition of 6 dBm to the signal strength at the output of one amplification section 330) to be at least 6 dBm, the signal strength at the output of each amplification section 330 must be more than 0 dBm to account for the loss in the combiner 340. Each power amplifier 335 may increase signal strength by 10 dB. Thus, given the exemplary signal strength of −10 dBm for the intermediate signal HF, the 0 dBm output of the amplification section 330 (with 10 dBm gain for one power amplifier 335) would provide approximately 6 dBm signal strength for the output signal RF_out if the loss at the combiner 340 were negligible FIG. 4 is a block diagram of a chip-based transmit channel architecture in a radar system 110 according to additional exemplary one or more embodiments. A different exemplary embodiment of the RF front end 215 is shown in FIG. 4 as compared with FIG. 3. In the exemplary embodiment shown in FIG. 4, a single up-conversion section 410 is used to increase the frequency of the input signal RF_in to produce the intermediate signal HF. The splitter 310 follows the up-conversion section 410 and provides inputs to four amplification sections 330 that are described with reference to FIG. 3 and not detailed again here. As also noted with reference to FIG. 3, the output of each of the amplification sections 330 is aggregated by a combiner 340 to obtain the output signal RF_out to be emitted as the transmit signal 115.

The single up-conversion section 410 assumes that the signal strength of the input signal RF_in does not exceed the limit for the CMOS transistor that includes the up-conversion section 410. As noted with reference to FIG. 3, the multiplier 325 introduces loss that reduces the signal strength of the intermediate signal HF relative to the signal strength of the input signal RF_in. Thus, according to the embodiment shown in FIG. 4, the up-conversion section 410 includes a power amplifier 335. Essentially, the power amplifier 335 included in the up-conversion section 410 recovers the signal strength lost to the multiplier 325.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A radar system, comprising:
a transmit section configured to emit a transmit signal;
a chip-based front-end portion of the transmit section configured to increase a frequency of an input signal to produce an intermediate signal and amplify signal strength of the intermediate signal to produce the transmit signal, the frequency of the input signal being in a range of 76 gigahertz (GHz) to 80 GHz, wherein the front-end portion includes two or more electrostatic discharge (ESD) devices; and a receive section configured to receive a reflected signal resulting from reflection of the transmit signal by an object.

2. The radar system according to claim 1, wherein the front-end portion includes a three times multiplier to increase the frequency of the input signal and produce the intermediate signal with a frequency range of 228 GHz to 240 GHz.

3. The radar system according to claim 2, wherein the intermediate signal is split to provide input to two or more channels, each of the two or more channels includes a power amplifier to amplify a signal strength of the input and provide amplified output, and the amplified output of each of the two or more channels is combined to provide the transmit signal.

4. The radar system according to claim 1, wherein the front-end portion includes a splitter to split the input signal as input to each of the two or more channels.

5. The radar system according to claim 4, wherein each of the two or more channels includes a multiplier to increase the frequency of the input to the channel and generate an intermediate signal.

6. The radar system according to claim 5, wherein each of the two or more channels includes a power amplifier to amplify a signal strength of the intermediate signal of the channel and produce an amplified signal.

7. The radar system according to claim 6, wherein the front-end portion includes a combiner to combine the amplified signal of each of the two or more channels to provide the transmit signal.

8. The radar system according to claim 1, wherein each of the two or more ESD devices acts as a bandpass filter for a range of frequencies.

9. The radar system according to claim 8, wherein at least one of the two or more ESD devices passes a frequency of the input signal, and at least another of the two or more ESD devices passes a frequency of the intermediate signal.

10. The radar system according to claim 1, wherein the radar system is disposed in a vehicle, and information obtained by processing the reflected signal is used to control an operation of the vehicle.

11. A method of assembling a radar system, the method comprising:
forming a transmit section to emit a transmit signal;
fabricating a chip-based front-end portion of the transmit section to increase a frequency of an input signal to produce an intermediate signal and amplify signal strength of the intermediate signal to produce the transmit signal, the frequency of the input signal being in a range of 76 gigahertz (GHz) to 80 GHz, wherein the fabricating the front-end portion includes forming two or more electrostatic discharge (ESD) devices; and
forming a receive section to receive a reflected signal resulting from reflection of the transmit signal by an object.

12. The method according to claim 11, wherein the fabricating the front-end portion includes fabricating a three times multiplier to increase the frequency of the input signal and produce the intermediate signal with a frequency range of 228 GHz to 240 GHz.

13. The method according to claim 12, wherein the fabricating the front-end portion includes arranging a passive splitter to split the intermediate signal and provide input to two or more channels, fabricating a power amplifier in each of the two or more channels to amplify a signal strength of the input and provide amplified output, and arranging a combiner to combine the amplified output of each of the two or more channels to provide the transmit signal.

14. The method according to claim 11, wherein the fabricating the front-end portion includes arranging a splitter to split the input signal as input to each of the two or more channels.

15. The method according to claim 14, wherein the fabricating the front-end portion includes fabricating a multiplier in each of the two or more channels to increase the frequency of the input to the channel and generate an intermediate signal.

16. The method according to claim 15, wherein the fabricating the front-end portion includes fabricating a power amplifier in each of the two or more channels to amplify a signal strength of the intermediate signal of the channel and produce an amplified signal.

17. The method according to claim 16, wherein the fabricating the front-end portion includes arranging a combiner to combine the amplified signal of each of the two or more channels to provide the transmit signal.

18. The method according to claim 11, wherein the two or more electrostatic discharge (ESD) devices act as a bandpass filter for a range of frequencies, and the forming the two or more ESD devices includes sizing each of the two or more ESD devices based on the range of frequencies.

19. The method according to claim 18, wherein the fabricating the front-end portion includes forming and disposing at least one of the two or more ESD devices to pass a frequency of the input signal, and forming and disposing at least another of the two or more ESD devices to pass a frequency of the intermediate signal.

20. The method according to claim 11, further comprising disposing the radar system in a vehicle and controlling an operation of the vehicle by using information obtained by processing the reflected signal.

* * * * *